US011354896B2

(12) United States Patent
Maruyama et al.

(10) Patent No.: US 11,354,896 B2
(45) Date of Patent: Jun. 7, 2022

(54) DISPLAY DEVICE, DISPLAY METHOD, AND COMPUTER PROGRAM (71) Applicant: Seiko Epson Corporation, Tokyo (JP)

(72) Inventors: Yuya Maruyama, Fuefuki (JP); Hideki Tanaka, Chino (JP)

(73) Assignee: Seiko Epson Corporation ( * ) Notice: Subject to any disclaimer, the term of this patent is extended or adjusted under 35 U.S.C. 154(b) by 0 days.

(21) Appl. No.: 16/943,223

(22) Filed: Jul. 30, 2020

(65) Prior Publication Data
US 2021/0034873 A1 Feb. 4, 2021

(30) Foreign Application Priority Data

Jul. 31, 2019 (JP) .............................. JP2019-140781

(51) Int. Cl.
G06V 20/20 (2022.01)
G06T 11/00 (2006.01)
G06V 40/20 (2022.01)

(52) U.S. Cl.
CPC .............. *G06V 20/20* (2022.01); *G06T 11/00* (2013.01); *G06V 40/28* (2022.01)

(58) Field of Classification Search
CPC combination set(s) only.
See application file for complete search history.

(56) References Cited

U.S. PATENT DOCUMENTS

| 8,818,716 B1* | 8/2014 | El Dokor | G01C 21/3682 |
| | | | 701/426 |
| 8,836,768 B1* | 9/2014 | Rafii | G06F 3/0304 |
| | | | 348/47 |
| 9,096,920 B1* | 8/2015 | Gomez | G06F 3/04815 |
| 9,459,706 B2* | 10/2016 | Kamba | G02B 27/017 |
| 10,120,526 B2* | 11/2018 | Han | G06F 3/0304 |
| 10,281,976 B2* | 5/2019 | Nishizawa | G06F 3/017 |
| 2010/0067741 A1* | 3/2010 | Stolkin | G06T 7/277 |
| | | | 348/169 |
| 2014/0104168 A1* | 4/2014 | Hegde | G06F 3/005 |
| | | | 345/157 |
| 2014/0168056 A1 | 6/2014 | Swaminathan et al. | |
| 2014/0361988 A1 | 12/2014 | Katz et al. | |

(Continued)

FOREIGN PATENT DOCUMENTS

| JP | 2002-042172 A | 2/2002 |
| JP | 2016-509705 A | 3/2016 |
| JP | 2018-028922 A | 2/2018 |

*Primary Examiner* — Motilewa Good-Johnson (74) *Attorney, Agent, or Firm* — Harness, Dickey & Pierce, P.L.C.

(57) ABSTRACT

A display device includes a display, a camera that captures images of an outside scene, a pointer recognizing section, a target recognizing section, and a display control section configured to display, on the display, a target related image, which is an image related to a target recognized by the target recognizing section. The display control section includes a related display configured to display, on the display, related information related to the target related image when a movement of a pointer within a range overlapping the target related image is recognized by the pointer recognizing section and a display processing section configured to change a display state of the target related image according to whether the target related image is present within an imaging range of the camera.

5 Claims, 10 Drawing Sheets (56) References Cited

U.S. PATENT DOCUMENTS

| | | | |
|---|---|---|---|
| 2015/0348329 A1* | 12/2015 | Carre | H04N 21/4782 |
| | | | 345/633 |
| 2016/0300109 A1* | 10/2016 | Aonuma | G06T 19/006 |
| 2017/0345197 A1* | 11/2017 | Sakai | G06T 11/00 |
| 2020/0211292 A1* | 7/2020 | Wu | G06F 30/20 |

* cited by examiner

DISPLAY DEVICE, DISPLAY METHOD, AND COMPUTER PROGRAM

The present application is based on, and claims priority from JP Application Serial Number 2019-140781, filed Jul. 31, 2019, the disclosure of which is hereby incorporated by reference herein in its entirety.

BACKGROUND

1. Technical Field

The present disclosure relates to a technique for superimposing and displaying an image on an outside scene.

2. Related Art

There has been known a technique for causing a display device to superimpose and display an image on an outside scene, information concerning an object being displayed on the display device when an operator points at, with a hand, the object displayed on the display device (JP-A-2018-28922 (Patent Literature 1)).

In the related art, a movement of the hand of the operator is recognized using an image captured by an image sensor. In this case, when the hand of the operator is present outside a detection range of the image sensor, the hand of the operator is not recognized by the image sensor. Consequently, although the operator points at the object, it could occur that the information concerning the object is not displayed. Such a problem is not limited to the technique for recognizing the movement of the hand of the operator and displaying the information concerning the object and is common to a technique for recognizing a movement of a pointer and displaying information concerning a target related image.

SUMMARY

According to an aspect of the present disclosure, a display device is provided. The display device includes: a display that displays an image while allowing light from outside scene to be transmitted through the display; a camera that captures images the outside scene; one or more processors configured to: recognize a movement of a pointer using at least two captured images captured by the camera; recognize a target in the outside scene using the captured images; and display, on the display, a target related image, which is the image related to the target recognized by the target recognizing section, wherein the one or more processors are further configured to: display, on the display, related information related to the target related image when the movement of the pointer within a range overlapping the target related image is recognized by the pointer recognizing section; and change a display state of the target related image according to whether the target related image is present within an imaging range of the camera.

DESCRIPTION OF EXEMPLARY EMBODIMENTS

A. First Embodiment

Figure 1:
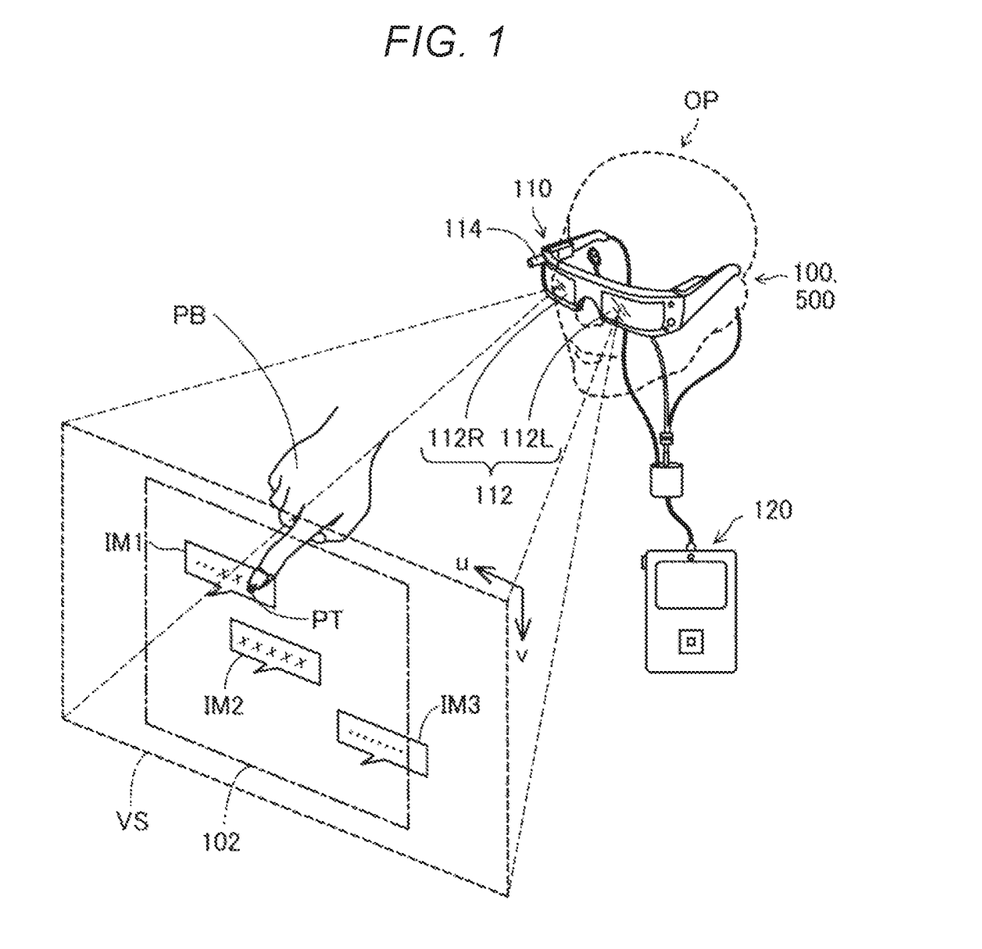
FIG. 1 is a diagram showing a display device in a first embodiment.

FIG. 1 is a diagram showing a display device 500 in a first embodiment. The display device 500 is configured by a head-mounted display device 100 mounted on the head of an operator OP. The head-mounted display device 100 recognizes a movement of a finger functioning as a pointer PB.

The head-mounted display device 100 includes an image display section 110 that causes the operator OP to visually recognize an image and a control section 120 that controls the image display section 110. The image display section 110 is configured as a wearing body worn on the head of the operator OP. In this embodiment, the image display section 110 has an eyeglass shape. The image display section 110 is configured by a display section 112 including a display section for right eye 112R and a display section for left eye 112L. A camera 114, which images an outside scene VW, is attached to the image display section 110. The image display section 110 is a transmission type and is configured to display an image to be visually recognizable while allowing light from the outside scene VW to be optically transmitted through the display section 112 thereby superimposing the image on the outside scene VW. That is, the head-mounted display device 100 is a transmission-type head-mounted display in which an image displayed by the display section 112 emerges in the outside scene VW visually recognized passing through the display section 112.

In an example shown in FIG. 1, a virtual screen VS is displayed in a space of the outside scene VW using the display section 112. Target related images IM1, IM2, and IM3, which are images related to a target such as a building in the outside scene VW, are displayed on the virtual screen VS while being linked with the target. The operator OP executes predetermined operation using the pointer PB on the target related images IM1, IM2, and IM3 displayed on the virtual screen VS. The head-mounted display device 100 photographs an image including the pointer PB using the camera 114 and detects a spatial coordinate of a distal end portion PT of the pointer PB and a movement of the pointer PB. The outer edge of an imaging range 102 of the camera 114 on the virtual screen VS is indicated by an alternate long and short dash line. A monocular camera is used as the camera 114.

The head-mounted display device 100 further executes processing corresponding to the detected spatial coordinate of the distal end portion PT and the detected movement of the pointer PB. The pointer PB is not limited to the finger. Other targets such as a pen for pointing and a pointing rod used by the operator OP to give an instruction can also be used.

Figure 2:
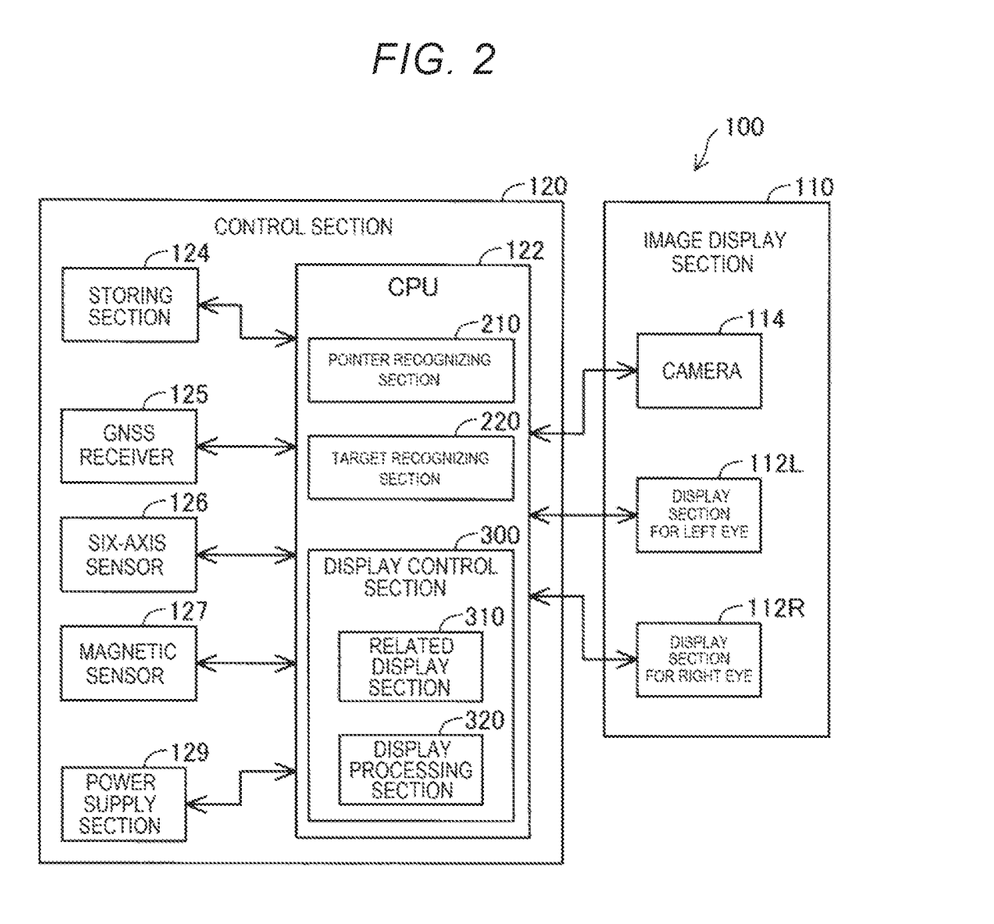
FIG. 2 is a functional block diagram of a head-mounted display device in the first embodiment.

FIG. 2 is a functional block diagram of the head-mounted display device 100 in the first embodiment. The control section 120 of the head-mounted display device 100 includes a CPU 122 functioning as a processor, a storing section 124, a GNSS receiver 125, a six-axis sensor 126, a magnetic sensor 127, and a power supply section 129.

The storing section 124 is configured by a ROM, a RAM, and the like. Various programs and the like to be executed by the CPU 122 are stored in the storing section 124.

The GNSS receiver 125 measures a present position of the head-mounted display device 100 based on a navigation signal received from an artificial satellite configuring a GNSS (Global Navigation Satellite System).

The six-axis sensor 126 is a motion sensor including a three-axis acceleration sensor and a three-axis gyro sensor. The magnetic sensor 127 is, for example, a three-axis terrestrial magnetism sensor. The power supply section 129 includes a battery and supplies electric power for the head-mounted display device 100 to operate.

The CPU 122 includes a pointer recognizing section 210, a target recognizing section 220, and a display control section 300. The CPU 122 is an example of one or more processors in the embodiments. In some embodiments, a processor may be or include a hardware circuit. A part or all of functions of the CPU 122 may be realized by a hardware circuit. The pointer recognizing section 210 recognizes a movement of the pointer PB using at least two captured images captured by the camera 114. The pointer recognizing section 210 performs pattern matching of, for example, a shape of the pointer PB stored in advance in the storing section 124 and a shape of a target in the captured images to recognize the pointer PB. The pointer recognizing section 210 recognizes the movement of the pointer PB using at least two captured images including the pointer PB captured in time series.

As shown in FIG. 1, a position in the virtual screen VS is represented by a u coordinate in the horizontal direction and a v coordinate in the vertical direction. The spatial coordinate of the distal end portion PT of the pointer PB can be represented by (u, v, Z) using a two-dimensional coordinate (u, v) and a depth coordinate Z of the virtual screen VS. In FIG. 1, the depth coordinate Z is the distance from a camera 114 to a fingertip, which is the distal end portion PT of the pointer PB. The pointer recognizing section 210 calculates an area of the distal end portion PT of the pointer PB imaged by the camera 114 and detects the depth coordinate Z according to the calculated area. Reference data indicating a relation between the distal end portion PT and the depth coordinate Z is stored in advance in the storing section 124. For example, in the storing section 124, reference data indicating a relation in which the depth coordinate Z is larger as the area of the distal end portion PT is smaller is stored. The pointer recognizing section 210 may represent the distal end portion PT with the two-dimensional coordinate (u, v) without calculating the depth coordinate Z. The pointer recognizing section 210 may calculate the depth coordinate Z using another method. For example, when the head-mounted display device 100 includes a distance sensor, the pointer recognizing section 210 may calculate the depth coordinate Z using a detection value of the distance sensor.

The target recognizing section 220 shown in FIG. recognizes targets in the outside scene VW using the captured image of the outside scene VW captured by the camera 114. In this embodiment, the target recognizing section 220 performs pattern matching of information concerning the target stored in advance in the storing section 124 and the targets in the captured image to recognize the target stored in advance. The target recognizing section 220 determines targets, target related images of which are displayed, among the recognized targets. In the storing section 124, a table in which targets and target related images related to the targets are associated for each of regions represented by latitude and longitude is stored. The target recognizing section 220 refers to the table stored in the storing section 124 to determine the targets, the target related images of which are displayed. The target recognizing section 220 may detect a predetermined marker in the captured image captured by the camera 114 to determine the targets, the target related images of which are displayed.

The display control section 300 displays, on the display section 112 of the image display section 110, an image related to the objects recognized by the target recognizing section 220. The display control section 300 includes a related display section 310 and a display processing section 320.

The related display section 310 displays, on the display section 112, related information related to the target related images IM1, IM2, and IM3 when a movement of the pointer PB within ranges overlapping the target related images IM1, IM2, and IM3 displayed on the display section 112 is recognized by the pointer recognizing section 210. The related information related to the target related images is stored in advance in the storing section 124. The related information is, for example, information indicating details of the target related images IM1, IM2, and IM3.

The display processing section 320 displays, on the display section 112, the target related images IM1, IM2, and IM3 related to the targets. The display processing section 320 changes a display state of the target related images IM1, IM2, and IM3 according to whether the target related images IM1, IM2, and IM3 are present within the imaging range 102 of the camera 114. That is, the display processing section 320 changes the display state of the target related images IM1, IM2, and IM3 between a first case in which the target related images IM1, IM2, and IM3 displayed on the display section 112 are present within the imaging range 102 of the camera 114 on the virtual screen VS and a second case in which the target related images IM1, IM2, and IM3 are present outside the imaging range 102 of the camera 114. In this embodiment, the display processing section 320 differentiates a degree of highlighting of the target related images IM1, IM2, and IM3 between the first case and the second case. For example, the display processing section 320 sets the degree of the highlighting of the target related images IM1, IM2, and IM3 larger in the first case compared with the second case. Specific content of processing executed by the display processing section 320 is explained below.

Figure 3:
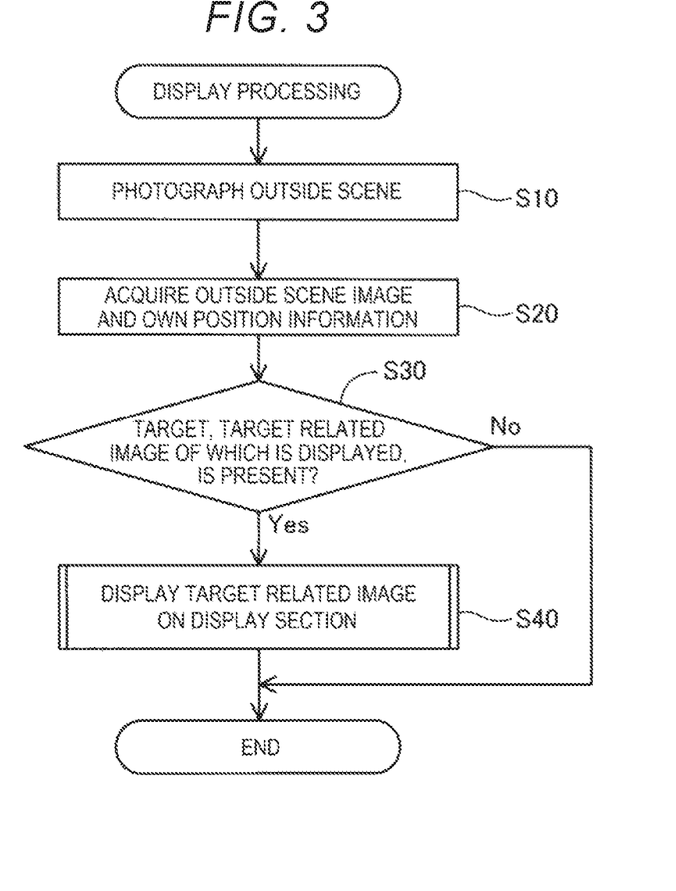
FIG. 3 is a flowchart of display processing executed by the head-mounted display device.
Figure 4:
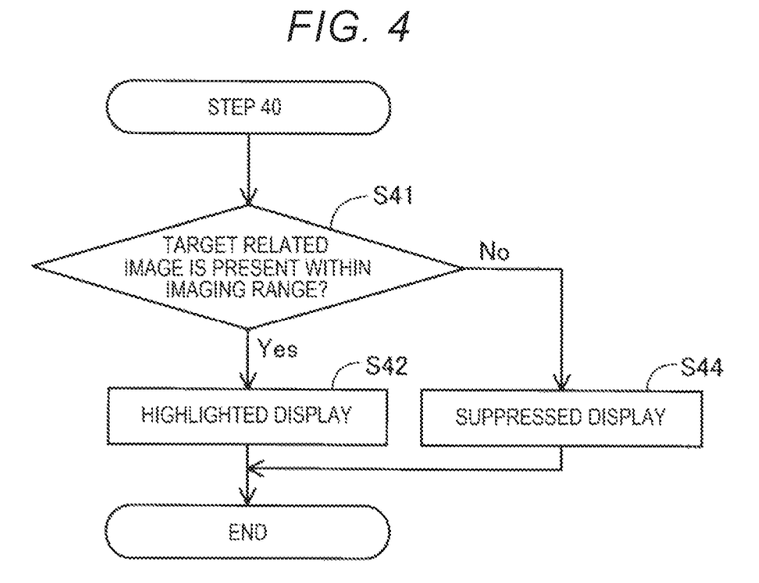
FIG. 4 is a flowchart showing details of step S40.
Figure 5:
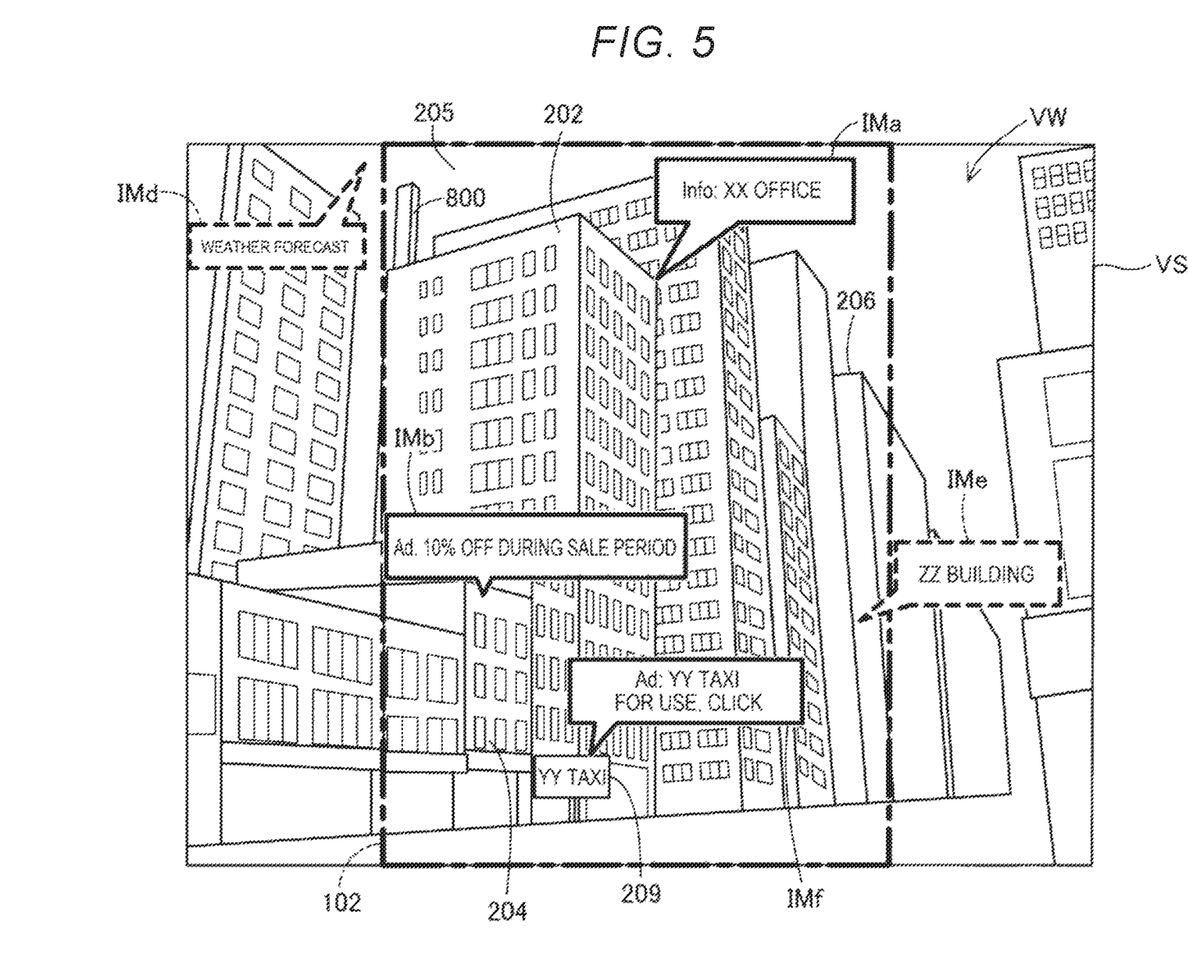
FIG. 5 is a diagram showing a target related image and an outside scene visually recognized through a display section.

FIG. 3 is a flowchart of display processing executed by the head-mounted display device 100. FIG. 4 is a flowchart showing details of step S40. FIG. 5 is a diagram showing target related images IMa to IMe displayed on the virtual screen VS using the display section 112 and the outside scene VW visually recognized through the display section 112. The display processing is executed while being triggered by a start instruction input to the control section 120 from the operator OP and is repeated at a fixed time interval.

As shown in FIG. 3, in step S10, the camera 114 photographs the outside scene VW. Subsequently, in step S20, the control section 120 acquires an outside scene image photographed by the camera 114 and own position information detected using the GNSS receiver 125, the six-axis sensor 126, and the like. The own position information may be the latitude and the longitude where the head-mounted display device 100 is located and the direction of the head-mounted display device 100. Subsequently, in step S30, the target recognizing section 220 determines, using the acquired own position information, the acquired outside scene image, and the data of the storing section 124, whether the targets, the target related images of which are displayed, are present.

When the targets, the target related images of which are displayed, are absent, the display processing of this routine ends. Display processing of the next routine is started after a predetermined time. On the other hand, when the targets, the target related images of which are displayed, are present, in step S40, the display processing section 320 displays the target related images on the display section 112.

As shown in FIG. 5, it is assumed that, among a plurality of targets in an outside scene image, targets 202, 204, 205, 206, and 209 are the targets, the target related images of which are displayed. The targets 202, 204, and 206 are buildings, the target 205 is the sky, and the target 209 is a signboard. In this case, the display control section 300 displays, on the display section 112 of the image display section 110, a target related image IMa related to the target 202, a target related image IMb related to the target 204, a target related image IMd related to the target 205, a target related image IMe related to the target 206, and a target related image IMf related to the target 209.

The target related image IMa is an image concerning an "XX office" occupying the building of the target 202. The target related image IMb is an image concerning sales of articles sold in the building of the target 204. The target related image IMd is an image concerning weather forecast. The target related image IMe is an image concerning a name of the building of the target 206. The target related image IMf is an image concerning content of a signboard "YY taxi" of the target 209. The target related images IMa, IMb, IMd, IMe, and IMf are balloon images pointing at the targets 202, 204, 205, 206, and 209. The display control section 300 displays the target related images IMa, IMb, IMd, IMe, and IMf such that relative positions of the target related images IMa, IMb, IMd, IMe, and IMf and the targets 202, 204, 205, 206, and 209 corresponding thereto are in a predetermined relation.

As shown in FIG. 4, in step S40, the display processing section 320 determines whether the target related images IMa to IMf are present within the imaging range 102 on the virtual screen VS. Specifically, when a half or more of an area surrounded by an outer frame of the target related images IMa to IMf is located within the imaging range 102, the display processing section 320 determines that the target related images IMa to IMf are located within the imaging range 102. In an example shown in FIG. 5, the display processing section 320 determines that the target related images IMa, IMb, and IMf are located within the imaging range 102 and the target related images IMd and IMe are present outside the imaging range 102.

As indicated by step S42 in FIG. 4, the display processing section 320 displays the target related images IMa, IMb, and IMf located within the imaging range 102 with a larger degree of highlighting than the target related images IMd and IMe located outside the imaging range 102. As indicated by step S44, the display processing section 320 displays the target related images IMd and IMe located outside the imaging range 102 with a smaller degree of highlighting than the target related images IMa, IMb, and IMf located within the imaging range 102. The display with the smaller degree of highlighting is referred to as suppressed display as well. Specifically, as shown in FIG. 5, the display processing section 320 displays outer frames of the target related images IMa, IMb, and IMf with solid lines and displays outer frames of the target related images IMd and IMe with dotted lines. By setting the degree of highlighting larger concerning the target related images IMa, IMb, and IMf located within the imaging range 102 in this way, it is possible to urge the operator OP of the display device 500 to operate the pointer PB within the imaging range 102 of the camera 114.

On the virtual screen VS shown in FIG. 5, the target related images IMa, IMb, and IMf displayed with the larger degree of highlighting are located within the imaging range 102 of the camera 114. Accordingly, on the virtual screen VS, a movement of the pointer PB can be recognized by the pointer recognizing section 210 within ranges overlapping the target related images IMa, IMb, and IMf. Consequently, the related display section 310 can display related information of the target related images IMa, IMb, and IMf. On the other hand, the target related images IMd and IMe displayed with the smaller degree of highlighting are located outside the imaging range 102 of the camera 114. Accordingly, on the virtual screen VS, even if the pointer PB is moved within ranges overlapping the target related images IMd and IMe, the movement cannot be recognized by the pointer recognizing section 210. Consequently, the related display section 310 cannot display related information of the target related images IMd and IMe. That is, the target related images IMa to IMf are displayed with different degrees of highlighting such that the operator OP can easily distinguish images, related information of which can be displayed by moving the pointer PB, and images, related information of which cannot be displayed even if the pointer PB is moved, on the target related images IMa to IMf.

Figure 6:
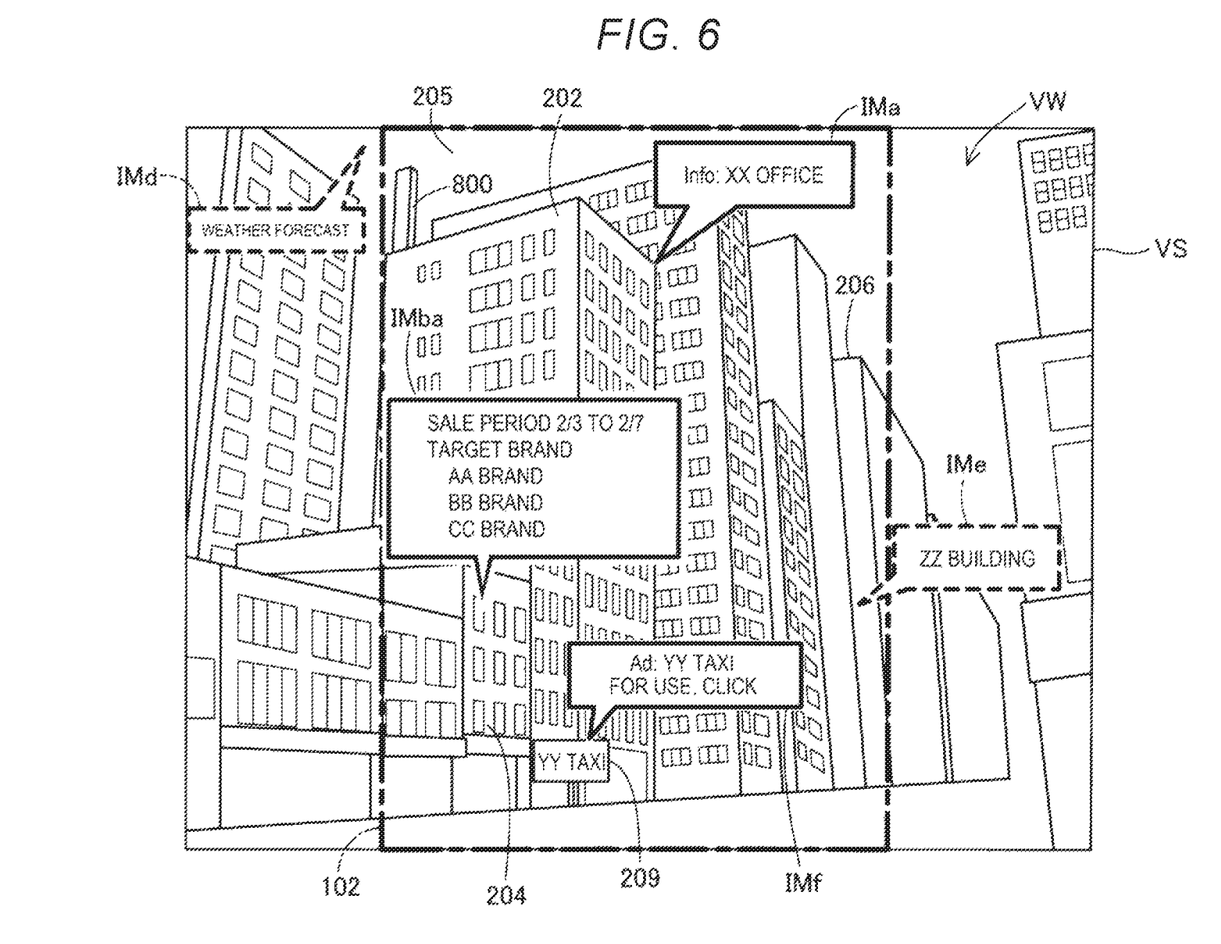
FIG. 6 is a diagram for explaining related information.

FIG. 6 is a diagram for explaining related information. The related display section 310 displays the related information on the display section 112 when the pointer recognizing section 210 recognizes a predetermined movement of the pointer PB within the ranges overlapping the target related images IMa, IMb, and IMf displayed with the larger degree of highlighting on the virtual screen VS. The predetermined movement is, for example, a tap motion, which is a motion of poking with the distal end portion PT. The related information corresponding to the target related images IMa to IMf is stored in the storing section 124. As shown in FIG. 6, when the pointer recognizing section 210 recognizes the predetermined movement of the pointer PB within a range overlapping the target related image IMb on the virtual screen VS, the related display section 310 displays related information IMba on the display section 112 instead of the target related image IMb. The related information IMba is an image representing a sale period and a sale target product.

Figure 7:
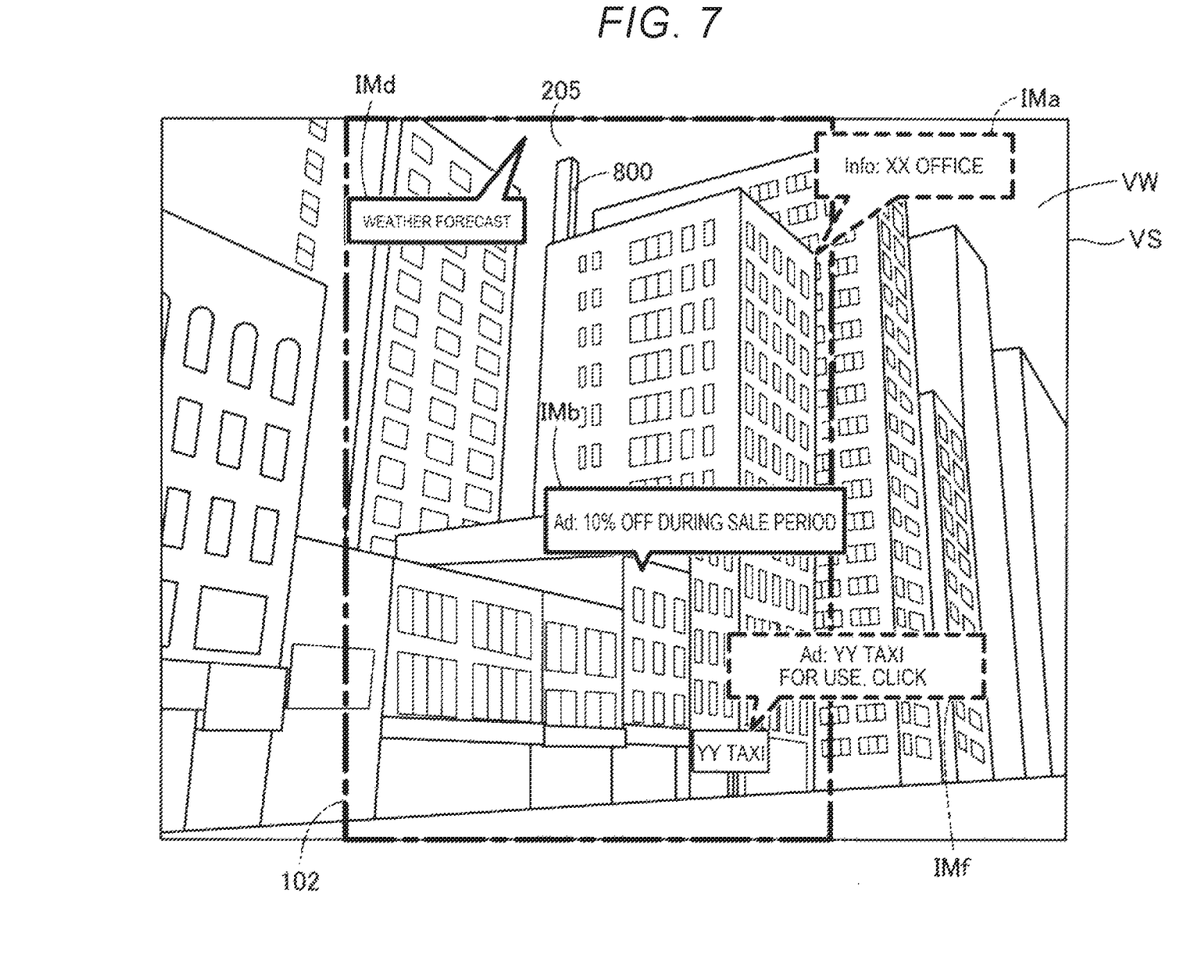
FIG. 7 is a second diagram showing the target related image and the outside scene visually recognized through the display section.

FIG. 7 is a second diagram showing the target related images IMa to IMe displayed on the virtual screen VS using the display section 112 and the outside scene VW visually recognized through the display section 112. When the operator OP turns to the left by a predetermined angle from a state shown in FIG. 5, the target related image IMd is located within the imaging range 102. In this case, the target related image IMd is highlighted. On the other hand, the target related images IMa and IMf are located outside the imaging range 102. In this case, the target related images IMa and IMf are displayed with a smaller degree of highlighting.

According to the first embodiment, the display processing section 320 changes a display state of the target related images IMa to IMf according to whether the target related images IMa to IMf are present within the imaging range 102 of the camera 114. Consequently, the operator OP of the display device 500 can easily discriminate whether the target related images IMa to IMf are located within the imaging range 102 of the camera 114. Consequently, it is possible to urge the operator OP to operate the distal end portion PT within the imaging range 102 of the camera 114, that is, a region that can be recognized by the pointer recognizing section 210. In the first embodiment, the change of the display state is executed by differentiating the degrees of highlighting of the target related images IMa to IMf. Consequently, the operator OP of the display device 500 can more easily discriminate whether the target related images IMa to IMf are located within the imaging range 102 of the camera 114.

B. Another Example of the Change of the Display State

In the first embodiment, the display processing section 320 changes the display state by displaying the outer frames with the solid lines when the target related images IMa to IMf are located within the imaging range 102 and displaying the outer frames with the dotted lines when the target related images IMa to IMf are located outside the imaging range 102. However, the change of the display state is not limited to this. Other examples are explained below.

Figure 8:
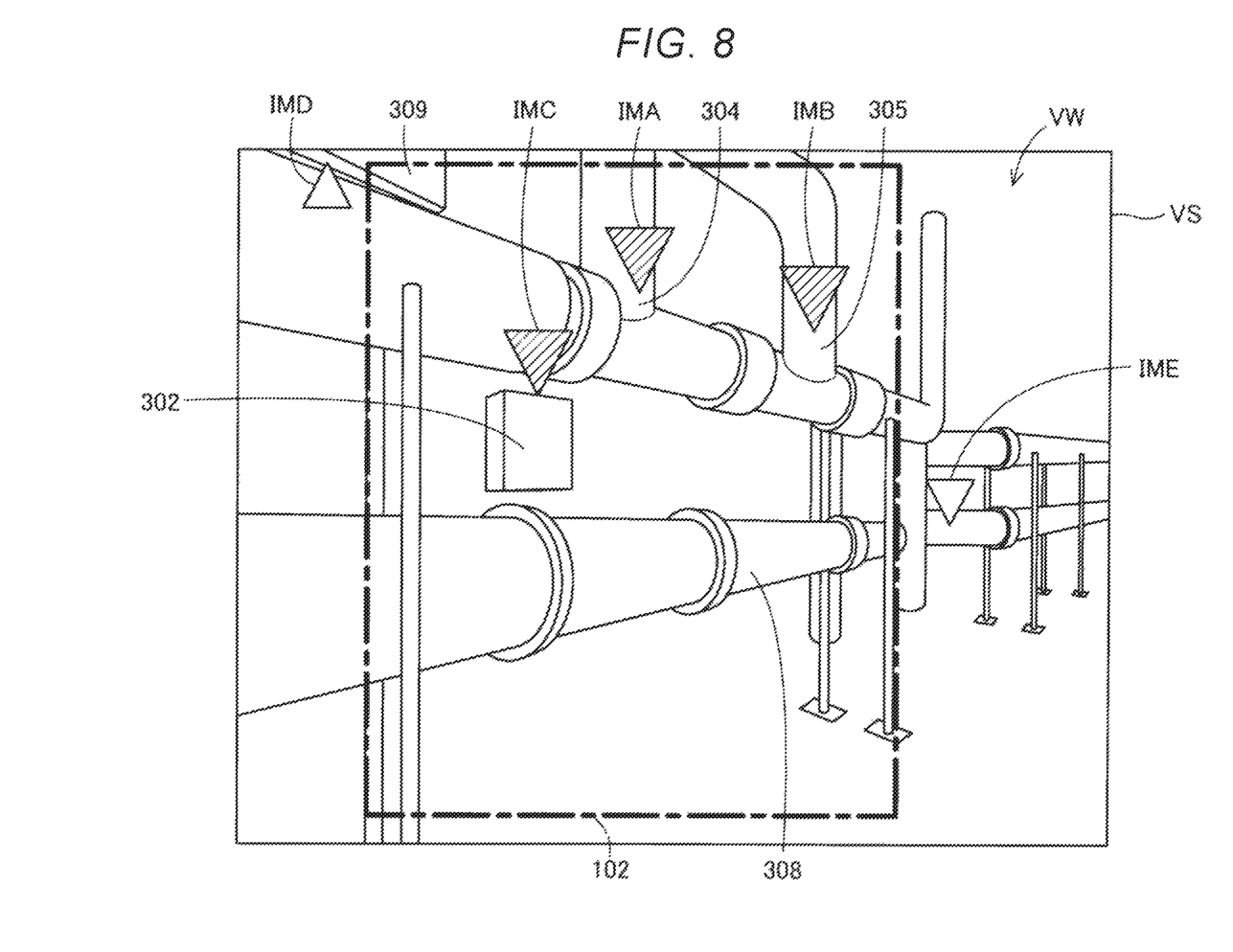
FIG. 8 is a diagram for explaining first another example about a change of a display state.

FIG. 8 is a diagram for explaining first another example concerning the change of the display state. In FIG. 8, the operator OP is located in a factory. A plurality of targets 302, 304, 305, 308, and 309 are present in the outside scene VW. The plurality of targets 302, 304, 305, 308, and 309 are a switch board and pipes. Target related images IMA, IMB, IMC, IMD, and IME related to the targets 302, 304, 305, 308, and 309 are displayed in predetermined positions on the virtual screen VS. Related information corresponding to the target related images IMA, IMB, IMC, IMD, and IME is stored in the storing section 124. The related information is, for example, names and handling explanation contents of the targets IMA, IMB, IMC, IMD, and IME. The display processing section 320 changes directions, colors, and sizes of the target related images IMA, IMB, IMC, IMD, and IME to change the display state. Specifically, concerning the target related images IMA, IMB, and IMC located within the imaging range 102, the display processing section 320 increases degrees of highlighting by displaying triangular figures in a direction in which vertexes of the triangular figures face down, displaying the triangular figures large, and displaying the triangular figures in colors. On the other hand, concerning the target related images IMD and IME located outside the imaging range 102, the display processing section 320 reduces degrees of highlighting by displaying triangular figures in a direction in which vertexes of the triangular figures face upward, displaying the triangular figures small, and displaying the triangular figures in gray.

Figure 9:
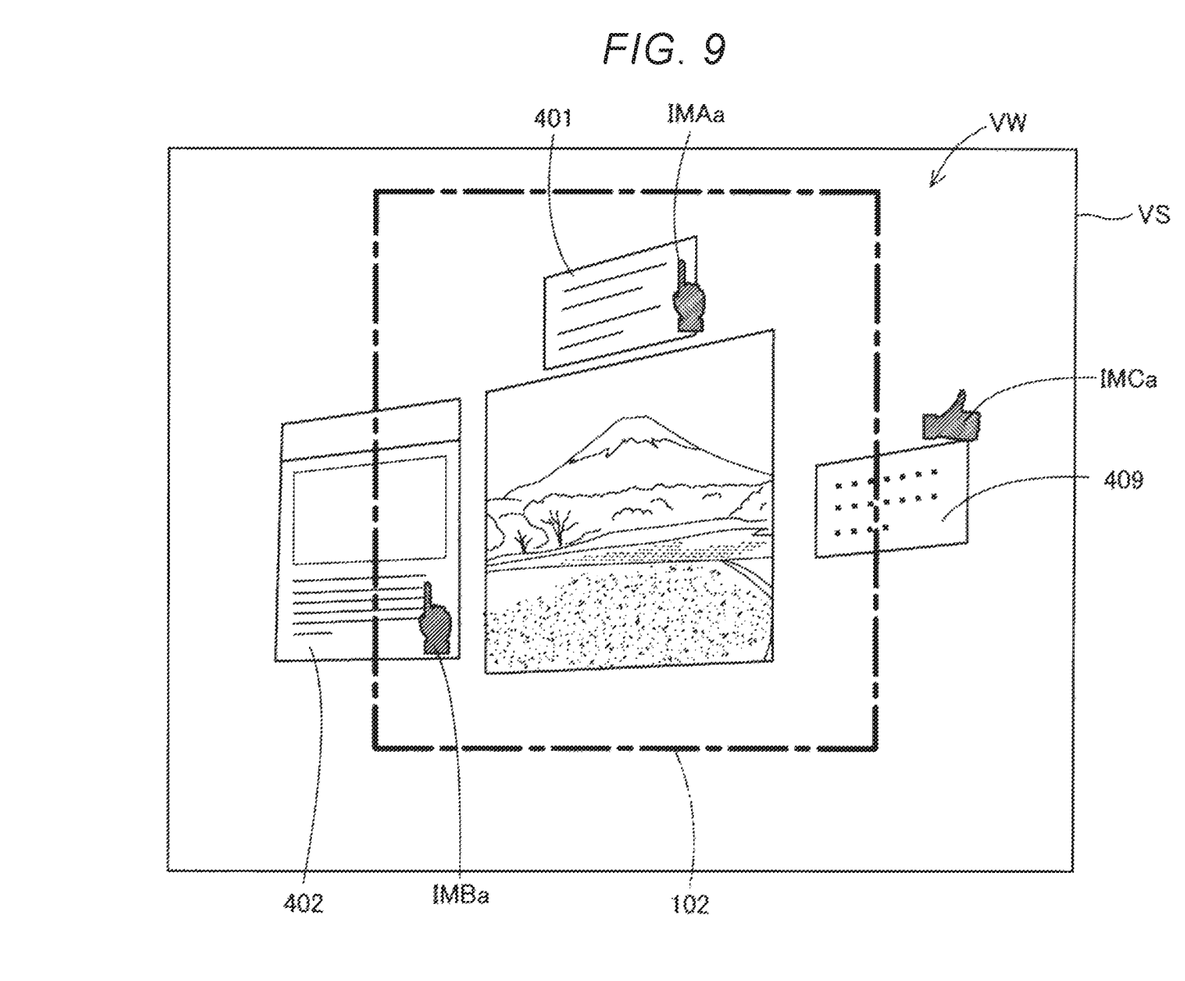
FIG. 9 is a diagram for explaining second another example about the change of the display state.

FIG. 9 is a diagram for explaining second another example concerning the change of the display state. In FIG. 9, the operator OP is located in a museum. A plurality of targets 401, 402, and 409 are present in the outside scene VW. The plurality of targets 401, 402, and 403 are panels on which explanations of paintings are described. Target related images IMAa, IMBa, and IMCa related to the targets 401, 402, and 403 are displayed in predetermined positions on the virtual screen VS. Related information corresponding to the target related images IMAa, IMBa, and IMCa is stored in the storing section 124. The related information is, for example, detailed explanations of the paintings. The display processing section 320 represents the target related images IMAa, IMBa, and IMCa as images simulating gestures. Specifically, the display processing section 320 displays the target related images IMAa and IMBa located within the imaging range 102 as images simulating a gesture of performing a tap motion with an index finger. The display processing section 320 displays the target related image IMCa located outside the imaging range 102 as an image simulating a gesture of thumbs up.

C. Another Example Concerning the Display of the Target Related Images

In the first embodiment, the display processing section 320 displays the target related images IMa to IMf in the predetermined positions on the virtual screen VS. For example, when the targets such as the buildings or the signboards are objects, as shown in FIG. 5, the display processing section 320 displays the target related images IMa, IMb, IMe, and IMf on the right side of the targets when viewed from the operator OP. Concerning the target such as the sky that is not an object, the display processing section 320 displays the target related image IMd in a predetermined position with respect to an object located on the upper side, for example, a lighting rod 800 in the outside scene VW transmitted through the display section 112 and superimposed on the virtual screen VS. However, when the target is located in the imaging range 102, the display processing section 320 may display the target related image of the target within the imaging range 102. This is explained below with reference to FIG. 10.

Figure 10:
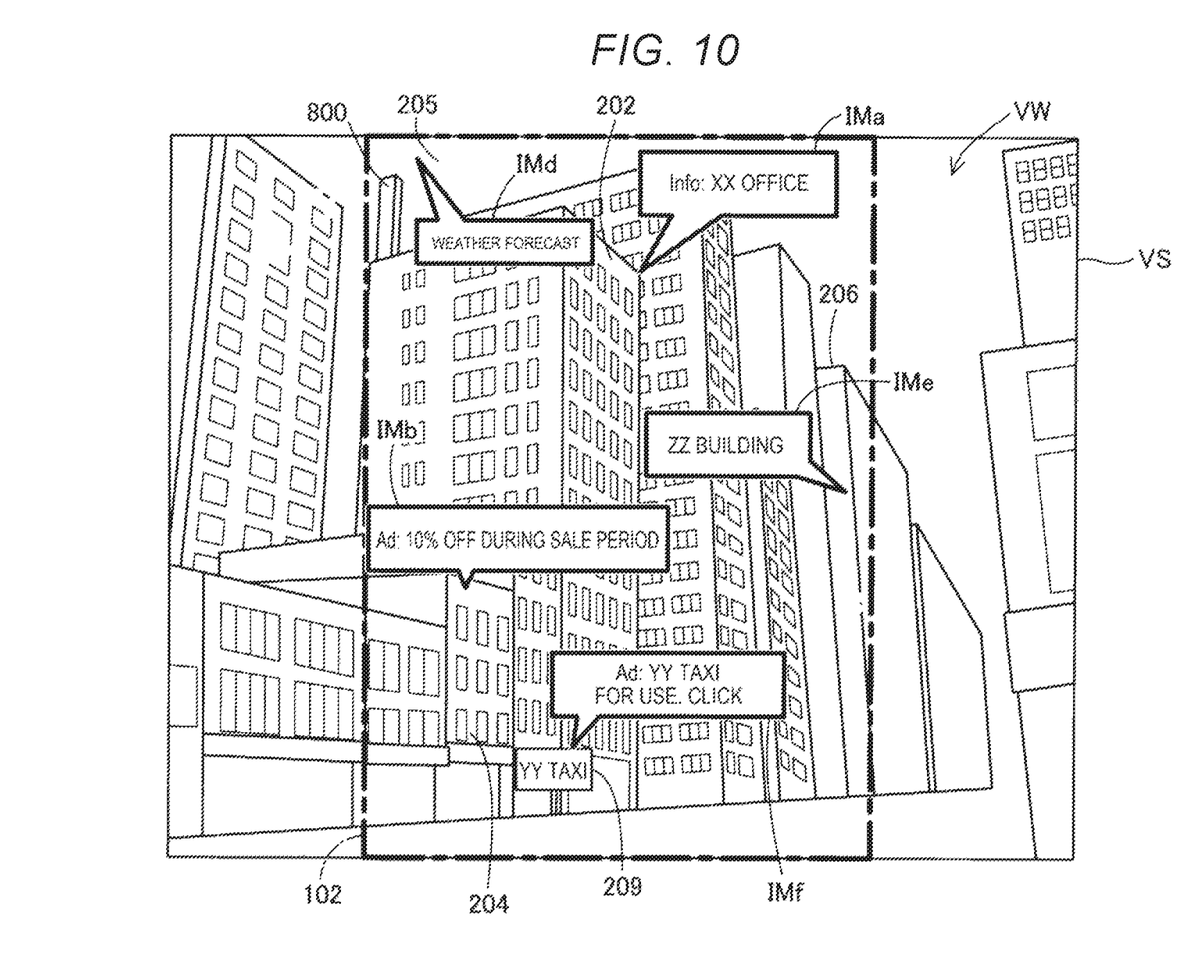
FIG. 10 is a diagram for explaining a display method for a target related image.

FIG. 10 is a diagram for explaining a display method for a target related images. The display processing section 320 displays, like the other targets 202, 204, and 209, the targets 205 and 206 to locate the target related images IMd and IMe within the imaging range 102 on the display section 112. Consequently, since a larger number of target related images IMa to IMf can be displayed within the imaging range 102 of the camera 114, the operator OP can cause the pointer PB to display more related information.

D. Other Aspects

The present disclosure is not limited to the embodiments explained above and can be realized in various aspects in a range not departing from the gist of the present disclosure. For example, the present disclosure can also be realized by aspects described below. The technical features in the embodiment corresponding to technical features in the aspects described below can be substituted or combined as appropriate in order to solve a part or all of the problems of the present disclosure or achieve a part or all of the effects of the present disclosure. Unless the technical features are explained in this specification as essential technical features, the technical features can be deleted as appropriate.

(1) According to an aspect of the present disclosure, a display device is provided. The display device includes: a display section configured to display an image to be visually recognizable while being transmitted through an outside scene and superimposed on the outside scene; a camera configured to image the outside scene; a pointer recognizing section configured to recognize a movement of a pointer using at least two captured images captured by the camera; a target recognizing section configured to recognize a target in the outside scene using the captured images; and a display control section configured to display, on the display section, a target related image, which is the image related to the target recognized by the target recognizing section. The display control section includes: a related display section configured to display, on the display section, related information related to the target related image when the movement of the pointer within a range overlapping the target related image is recognized by the pointer recognizing section; and a display processing section configured to change a display state of the target related image according to whether the target related image is present within an imaging range of the camera.

According to this aspect, since the display processing section changes the display state of the target related image according to whether the target related image is present within the imaging range of the camera, an operator of the display device can easily discriminate whether the target related image is located within the imaging range of the camera.

(2) In the aspect, the display control section may display the target related image while differentiating a degree of highlighting of the target related image between a first case in which the target related image is present within the imaging range of the camera and a second case in which the target related image is present outside the imaging range of the camera.

According to this aspect, since the display control section displays the target related image while differentiating the degree of highlighting of the target related image between the first case and the second case, the operator of the display device can easily discriminate whether the target related image is located within the imaging range of the camera.

(3) In the aspect, the display control section may set the degree of highlighting of the target related image larger in the first case compared with the second case.

According to this aspect, since the display control section sets the degree of highlighting of the target related image larger in the first case compared with the second case, it is possible to urge the operator of the display device to operate the pointer within the imaging range of the camera.

(4) In the aspect, when the target is located within the imaging range, the display control section may display the target related image of the target within the imaging range on the display section.

According to this aspect, it is possible to display the target related image within the imaging range of the camera.

The present disclosure can be realized in forms of a display method, a computer program, a recording medium recording the computer program, and the like besides the aspects described above.

What is claimed is:

1. A display device comprising:
a display that displays an image in a main screen while allowing light from outside scene to be transmitted through the display;
a camera that captures images of the outside scene;
a memory configured to store a program, first data relating to a plurality of target images corresponding to a plurality of targets in the outside scene, second data relating to a plurality of target related images corresponding to the plurality of targets, and third data relating to an imaging range of the camera, an area of the main screen being larger than an area of the imaging range; and
one or more processors configured to execute the program so as to:
recognize a movement and a position of a pointer using at least two images of the captured images captured in time series by the camera;
recognize a first target of the plurality of targets in the outside scene using the captured images and the first data;
display, on the display, a first target related image of the plurality of target related images corresponding to the first target using the second data, the first target related image being displayed next to the first target in the outside scene that is viewed through the display;
display, on the display, related information in the first target related image in the main screen when the movement or the position of the pointer is within a range overlapping the first target related image;
change a display state of the first target related image to a first degree of highlighting when the one or more processors determine that the first target related image is within the imaging range of the camera; and
change the display state of the first target related image to a second degree of highlighting when the one or more processors determine that the first target related image is outside the imaging range of the camera but is within the main screen, the second degree of highlighting being different from the first degree of highlighting.

2. The display device according to claim 1, wherein the one or more processors are further configured to set the first degree of highlighting of the first target related image larger than the second degree of highlighting.

3. The display device according to claim 1, wherein, when the first target is located within the imaging range, the one or more processors are further configured to display the first target related image of the first target within the imaging range on the display.

4. A display method of a display device, the display device including:
a display that displays an image in a main screen while allowing light from an outside scene to be transmitted through the display;
a camera that captures images of the outside scene; and
a memory configured to store a program, first data relating to a plurality of target images corresponding to a plurality of targets in the outside scene, second data relating to a plurality of target related images corresponding to the plurality of targets, and third data relating to an imaging range of the camera, an area of the main screen being larger than an area of the imaging range, the display method for causing one or more processors to execute the program, the display method comprising executing on the one or more processors the steps of:
recognizing a movement and a position of the pointer using at least two images of the captured images captured in time series by the camera;
recognizing a first target of the plurality of targets in the outside scene using the captured images and the first data;
displaying, on the display, a first target related image of the plurality of target related images corresponding to the first target using the second data, the first target related image being displayed next to the first target in the outside scene that is viewed through the display;
displaying, on the display, related information in the first target related image in the main screen when the movement or the position of the pointer is within a range overlapping the first target related image;
changing a display state of the first target related image to a first degree of highlighting when the one or more processor determine that the first target related image is within the imaging range of the camera; and changing the display state of the first target related image to a second degree of highlighting when the one or more processors determine that the first target related image is outside the imaging range of the camera but is within the main screen, the second degree of highlighting being different from the first degree of highlighting.

5. A non-transitory computer-readable storage medium storing a computer program of a display device, the display device including:

a display that displays an image in a main screen while allowing light from an outside scene to be transmitted through the display;

a camera that captures images of the outside scene; and a memory configured to store a program, first data relating to a plurality of target images corresponding to a plurality of targets in the outside scene, second data relating to a plurality of target related images corresponding to the plurality of targets, and third data relating to an imaging range of the camera, an area of the main screen being larger than an area of the imaging range, the non-transitory computer-readable storage medium for causing a computer to execute the computer program by one or more processors so as to perform the steps of:

recognizing a movement and a position of a pointer using at least two images of the captured images captured by the camera;

recognizing a first target of the plurality of targets in the outside scene using the captured images and the first data;

displaying, on the display, a first target related image of the plurality of target related images corresponding to the first target using the second data, the first target related image being displayed next to the first target in the outside scene that is viewed through the display;

displaying, on the display, related information in the first target related image in the main screen when the movement or the position of the pointer is within a range overlapping the first target related image;

changing a display state of the first target related image to a first degree of highlighting when the one or more processor determine that the first target related image is within the imaging range of the camera; and changing the display state of the first target related image to a second degree of highlighting when the one or more processors determine that the first target related image is outside the imaging range of the camera but is within the main screen, the second degree of highlighting being different from the first degree of highlighting.

\* \* \* \* \*